(12) United States Patent
Izumo et al.

(10) Patent No.: US 10,967,677 B2
(45) Date of Patent: Apr. 6, 2021

(54) PNEUMATIC TIRE

(71) Applicant: SUMITOMO RUBBER INDUSTRIES, LTD., Kobe (JP)

(72) Inventors: Suguru Izumo, Kobe (JP); Ryoji Kojima, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 781 days.

(21) Appl. No.: 15/469,869

(22) Filed: Mar. 27, 2017

(65) Prior Publication Data

US 2017/0291450 A1 Oct. 12, 2017

(30) Foreign Application Priority Data

Apr. 11, 2016 (JP) .............................. JP2016-079008

(51) Int. Cl.
*B60C 1/00* (2006.01)
*C08K 3/36* (2006.01)
(Continued)

(52) U.S. Cl.
CPC ............ *B60C 1/0016* (2013.01); *C08C 19/25* (2013.01); *C08K 3/04* (2013.01); *C08K 3/06* (2013.01);
(Continued)

(58) Field of Classification Search
CPC .................................................... B60C 1/0016
(Continued)

(56) References Cited

U.S. PATENT DOCUMENTS

2009/0186965 A1 7/2009 Rodgers et al.
2011/0160337 A1* 6/2011 Ishino ................... B60C 1/0016
523/157
(Continued)

FOREIGN PATENT DOCUMENTS

EP 3 000 618 A1 3/2016
JP 2011-57892 A 3/2011
(Continued)

OTHER PUBLICATIONS

Office Action dated Feb. 18, 2020, in Japanese Patent Application No. 2016-079008.
(Continued)

*Primary Examiner* — Michael N Orlando
*Assistant Examiner* — Elizabeth Bradford
(74) *Attorney, Agent, or Firm* — Birch, Stewart, Kolasch & Birch, LLP

(57) ABSTRACT

There is provided a pneumatic tire having improved wet grip performance and fuel efficiency in a good balance. The pneumatic tire is provided with a tread composed of a rubber composition comprising not less than 0.5 part by mass of silica and not less than 5 parts by mass of a resin based on 100 parts by mass of a rubber component comprising 40 to 100% by mass of a styrene-butadiene rubber and 0 to 60% by mass of a butadiene rubber, wherein an adhesive force of the rubber composition measured by the specified adhesion test method is not less than 300 when an adhesive force of a reference rubber composition wherein the whole amount of resin has been replaced by oil is assumed to be 100, and a ratio of a loss tangent tan $\delta_{0°\ C.}$ at 0° C. of the rubber composition to a loss tangent tan $\delta_{70°\ C.}$ at 70° C. of the rubber composition (tan $\delta_{0°\ C.}$/tan $\delta_{70°\ C.}$ is from 3.0 to 10.

4 Claims, 4 Drawing Sheets

(51) Int. Cl.
   *C08L 9/00* (2006.01)
   *C08K 5/548* (2006.01)
   *C08K 3/06* (2006.01)
   *C08L 57/02* (2006.01)
   *C08K 5/47* (2006.01)
   *C08L 91/00* (2006.01)
   *C08K 5/18* (2006.01)
   *C08L 45/00* (2006.01)
   *C08K 5/09* (2006.01)
   *C08K 3/22* (2006.01)
   *C08L 47/00* (2006.01)
   *C08K 3/04* (2006.01)
   *C08C 19/25* (2006.01)
   *C08L 9/06* (2006.01)
   *C08L 15/00* (2006.01)
   *C08L 21/00* (2006.01)
   *C08K 3/02* (2006.01)

(52) U.S. Cl.
   CPC ............... *C08K 3/22* (2013.01); *C08K 3/36* (2013.01); *C08K 5/09* (2013.01); *C08K 5/18* (2013.01); *C08K 5/47* (2013.01); *C08K 5/548* (2013.01); *C08L 9/00* (2013.01); *C08L 9/06* (2013.01); *C08L 15/00* (2013.01); *C08L 21/00* (2013.01); *C08L 45/00* (2013.01); *C08L 47/00* (2013.01); *C08L 57/02* (2013.01); *C08L 91/00* (2013.01); *C08K 2003/023* (2013.01); *C08K 2201/006* (2013.01); *C08L 2205/02* (2013.01); *C08L 2205/08* (2013.01)

(58) Field of Classification Search
   USPC .................................................... 156/151
   See application file for complete search history.

(56) References Cited

U.S. PATENT DOCUMENTS

| | | |
|---|---|---|
| 2012/0016056 A1 | 1/2012 | Miyazaki |
| 2014/0107261 A1 | 4/2014 | Miyazaki |
| 2014/0256847 A1 | 9/2014 | Sato et al. |
| 2016/0090475 A1 | 3/2016 | Nakatani et al. |

FOREIGN PATENT DOCUMENTS

| | | |
|---|---|---|
| JP | 2011-508815 A | 3/2011 |
| JP | 2011-132412 A | 7/2011 |
| JP | 2012-36370 A | 2/2012 |
| JP | 2013-185091 A | 9/2013 |
| JP | 2013-185092 A | 9/2013 |
| JP | 2014-201637 A | 10/2014 |
| JP | 2015-523430 A | 8/2015 |
| WO | WO 2013/077020 A1 | 5/2013 |
| WO | WO 2013/176712 A1 | 11/2013 |

OTHER PUBLICATIONS

Communication Pursuant to Article 94(3) EPC dated Mar. 20, 2020, in European Patent Application No. 17 164 897.5.

\* cited by examiner

PNEUMATIC TIRE

TECHNICAL FIELD

The present invention relates to a pneumatic tire having a tread composed of a specified rubber composition.

BACKGROUND OF THE INVENTION

Recently reduction of fuel consumption of a vehicle has been achieved by decreasing rolling resistance of a tire to inhibit heat generation of the tire. A demand for enhancement of fuel efficiency of a vehicle is increasing, and among tire components, excellent heat build-up characteristic (fuel efficiency) is required in particular for a tread having a high share in the tire components. Further, in the light of safety during running of a vehicle, wet grip performance is also required for a tread.

Generally in order to enhance fuel efficiency, it is effective to decrease a hysteresis loss (tan δ) of a rubber composition. Further, in order to enhance wet grip performance, a method of increasing a frictional force of a hysteresis loss friction, an adhesive friction and a digging-up friction is considered.

However, when a hysteresis loss is decreased to enhance fuel efficiency, there is a problem that a hysteresis loss friction becomes small and wet grip performance is deteriorated. That is, it is difficult to make fuel efficiency compatible with wet grip performance only by a viscoelastic property (tan δ).

It is considered to enhance wet grip performance by increasing an adhesive friction. For example, a method of enhancing an adhesive frictional force by increasing an amount of a softening agent such as oil to increase an amount of an adhesive substance generated in a rubber composition. However, if an amount of the generated adhesive substance is large, there is a problem that abrasion resistance is lowered.

JP 2012-036370 A describes a method of improving fuel efficiency, grip performance and abrasion resistance by a rubber composition comprising a molten mixture of a specific solid resin and a specific softening agent. However, an adhesive force of the rubber composition is not described, and there is still room for improvement with respect to enhancement of wet grip performance and fuel efficiency in a good balance.

SUMMARY OF THE INVENTION

The inventors of the present invention have made intensive study and as a result, have found that by compounding a specific resin into a rubber composition for a tread, an adhesion layer comprising the resin can be generated in the rubber composition, thereby improving an adhesive force of the rubber composition, and have repeated further studies and have completed the present invention.

An object of the present invention is to provide a pneumatic tire having improved wet grip performance and fuel efficiency in a good balance.

The present invention relates to a pneumatic tire with a tread composed of a rubber composition comprising not less than 0.5 part by mass of silica and not less than 5 parts by mass of a resin based on 100 parts by mass of a rubber component comprising 40 to 100% by mass of a styrene-butadiene rubber and 0 to 60% by mass of a butadiene rubber, wherein an adhesive force of the rubber composition measured by the following adhesion test method is not less than 300 when an adhesive force of a reference rubber composition in which the whole amount of resin was replaced by oil is assumed to be 100; a loss tangent tan $\delta_{70°\ C.}$ at 70° C. of the rubber composition is not more than 125 when a loss tangent tan $\delta_{70°\ C.}$ of the reference rubber composition is assumed to be 100; and a ratio of a loss tangent tan $\delta_{0°\ C.}$ at 0° C. of the rubber composition to a loss tangent tan $\delta_{70°\ C.}$ at 70° C. of the rubber composition (tan $\delta_{0°\ C.}$/tan $\delta_{70°\ C.}$) is from 3.0 to 10.

<Adhesion Test Method>

The adhesion test method comprises:
a preparation step of preparing a test rubber,
a friction test step of conducting a wet friction test and generating an adhesive substance on a surface of the test rubber,
a step of measuring the adhesive substance wherein a volume of the adhesive substance and an adhesive force per unit area of the adhesive substance are measured, and
an evaluation step of evaluating an adhesive force of the test rubber based on the volume of the adhesive substance and the adhesive force per unit area of the adhesive substance.

According to the present invention, a pneumatic tire having wet grip performance and fuel efficiency being excellent in a good balance can be provided.

DETAILED DESCRIPTION

Figure 1:
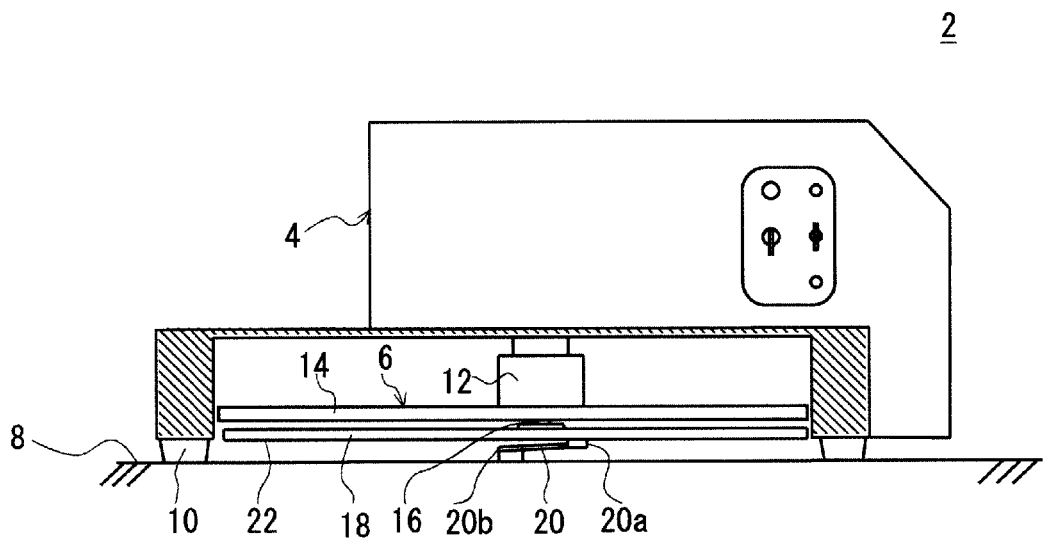
FIG. 1 is a front view of a test apparatus used for the adhesion test method.

The tire of the present invention is featured by having a tread composed of a rubber composition comprising a specific rubber component, silica and a specific resin in predetermined amounts.

The rubber component comprises predetermined amounts of styrene-butadiene rubber (SBR) and butadiene rubber (BR).

The SBR is not limited particularly, and usual ones in the rubber industry such as an emulsion-polymerized styrene-butadiene rubber (un-modified E-SBR), a solution-polymerized styrene-butadiene rubber (un-modified S-SBR) and a modified SBR obtained by modifying terminals of the SBRs (modified E-SBR and modified S-SBR) can be used.

A content of the SBR in the rubber component is not less than 40% by mass, preferably not less than 50% by mass, more preferably not less than 60% by mass. When the content of the SBR is less than 40% by mass, there is a tendency that wet grip performance and abrasion resistance cannot be obtained. Further, the content of the SBR can be 100% by mass, but is preferably not more than 90% by mass, more preferably not more than 80% by mass from the viewpoint of fuel efficiency.

The BR is not limited particularly, and usual ones in the rubber industry such as a high-cis BR having a cis content of not less than 90%, a modified BR having a modified terminal and/or a modified main chain and a modified BR coupled with tin, a silicon compound or the like (a condensate, one having a branched structure or the like) can be used.

When the rubber component comprises the BR, a content of the BR in the rubber component is preferably not less than 5% by mass, more preferably not less than 10% by mass, further preferably not less than 15% by mass from the viewpoint of abrasion resistance. Further, the content of the BR is not more than 60% by mass, preferably not more than 50% by mass, more preferably not more than 40% by mass. When the content of the BR exceeds 60% by mass, grip performance tends to be inferior.

The rubber component can comprise rubber components other than the SBR and the BR such as a natural rubber (NR), an isoprene rubber (IR), an epoxidized natural rubber (ENR) and a styrene-isoprene-butadiene rubber (SIBR) according to necessity. However, a rubber component consisting of SBR and BR is preferable from the viewpoint of wet grip performance.

The silica is not limited particularly, and examples thereof include silica prepared by a dry method (anhydrous silica), silica prepared by a wet method (hydrous silica) and the like. For the reason that the number of silanol groups is large, silica prepared by a wet method is preferable.

A nitrogen adsorption specific surface area ($N_2AS$) of the silica is preferably not less than 80 $m^2/g$, more preferably not less than 100 $m^2/g$, from the viewpoint of durability and elongation at break. Further, from the viewpoint of fuel efficiency and processability, the $N_2AS$ of the silica is preferably not more than 250 $m^2/g$, more preferably not more than 220 $m^2/g$. Herein, the $N_2AS$ of the silica is a value measured in accordance with ASTM D3037-93.

The content of the silica is not less than 0.5 part by mass, preferably not less than 30 parts by mass, more preferably not less than 50 parts by mass based on 100 parts by mass of the rubber component. When the content of the silica is less than 0.5 part by mass, there is a tendency that durability and elongation at break are lowered. Further, the content of the silica is preferably not more than 200 parts by mass, more preferably not more than 150 parts by mass, further preferably not more than 120 parts by mass from the viewpoint of dispersibility at the time of kneading and processability.

A softening point of the resin is preferably not lower than 40° C., more preferably not lower than 60° C., further preferably not lower than 80° C. When the softening point of the resin is lower than 40° C., there is a tendency that lowering of hysteresis loss friction and steering stability and lowering of handling property such as blocking during storage occurs. Further the softening point of the resin is preferably not higher than 200° C., more preferably not higher than 150° C. from the viewpoint of dispersibility during kneading. In addition, in the present invention, the softening point of the resin is determined by the following method. Namely, while heating 1 g of the resin as a sample at a temperature elevating rate of 6° C. per minute using Flowtester (CFT-500D manufactured by Shimadzu Corporation or the like), a load of 1.96 MPa is applied to the sample with a plunger, the sample is extruded through a nozzle having a diameter of 1 mm and a length of 1 mm, and a descending distance of the plunger of the Flowtester is plotted to a temperature. The softening point of the resin is a temperature when a half of the sample was flowed out.

The resin is not limited particularly, and examples thereof include resins commonly used in the tire industry. For example, there are exemplified aromatic hydrocarbon resins such as a phenol resin, an alkylphenol resin, a terpene phenol resin, a terpene resin, a coumaron resin, an indene resin, a coumaron-indene resin, a styrene resin, an α-methyl styrene resin, an a-methyl styrene/styrene resin, an acrylic resin, a rosin resin and a dicyclopentadiene resin (DCPD resin), aliphatic hydrocarbon resins such as C5 resin, C8 resin, C9 resin and C5/C9 resin, and the like. These resins can be used alone or can be used in combination of two or more thereof. Further, these resins may be ones subjected to a hydrogenation treatment.

A content of the resin is not less than 5 parts by mass, preferably not less than 10 parts by mass, more preferably not less than 15 parts by mass based on 100 parts by mass of the rubber component. When the resin content is less than 5 parts by mass, there is a tendency that an amount of resin contained in the adhesion layer becomes small and a sufficient adhesive force of the rubber composition cannot be obtained. Further, the resin content is preferably not more than 50 parts by mass, more preferably not more than 40 parts by mass for the reason that blooming is inhibited and abrasion resistance is satisfactory.

In addition to the above-mentioned components, to the rubber composition of the present invention can be properly added other compounding agents generally used in the tire industry, for example, a reinforcing filler such as carbon black, oil, a silane coupling agent, zinc oxide, stearic acid, various anti-aging agents, a wax, a vulcanizing agent, a vulcanization accelerator and the like.

The carbon black is not limited particularly, and there are exemplified, for example, those of SAF, ISAF, HAF, FF, FEF and GPF grades. These carbon blacks can be used alone or can be used in combination of two or more thereof.

A nitrogen adsorption specific surface area ($N_2AS$) of the carbon black is preferably not less than 80 $m^2/g$, more preferably not less than 100 $m^2/g$, from the viewpoint of reinforceability and abrasion resistance. Further, from the viewpoint of dispersibility and fuel efficiency, the $N_2AS$ of the carbon black is preferably not more than 280 $m^2/g$, more preferably not more than 250 $m^2/g$. It is noted that the nitrogen adsorption specific surface area of the carbon black is measured in accordance with JIS K6217 Method A.

When the rubber composition comprises carbon black, a content of the carbon black is preferably not less than 1 part by mass, more preferably not less than 3 parts by mass based on 100 parts by mass of the rubber component from the viewpoint of reinforceability. Further the content of the carbon black is preferably not more than 150 parts by mass, more preferably not more than 100 parts by mass from the viewpoint of processability, fuel efficiency and abrasion resistance.

To the rubber composition of the present invention may be compounded oil. By compounding oil, processability can be improved and a strength of the rubber can be increased. Examples of oil include process oil, vegetable oil, animal oil and the like.

Examples of the process oil include paraffin process oil, naphthene process oil, aromatic process oil, and the like. Further there are exemplified process oils having a low content of a polycyclic aromatic compound (PCA) in consideration of environment. Examples of process oils having a low PCA content include treated distillate aromatic extract (TDAE) obtained by re-extracting aromatic process oil, alternative aromatic oil which is a mixed oil of asphalt and naphthene oil, mild extraction solvates (MES), heavy naphthene oil, and the like.

Examples of the vegetable oils include castor oil, cotton seed oil, linseed oil, rapeseed oil, soybean oil, palm oil, coconut oil, peanut oil, rosin, pine oil, pine tar, tall oil, corn oil, rice oil, sesame oil, olive oil, sunflower oil, palm kernel oil, camellia oil, jojoba oil, macadamia nut oil, safflower oil, tung oil, and the like.

Examples of the animal oils include oleyl alcohol, fish oil, beef tallow and the like.

Among these oils, process oils are preferable for the reason that they are advantageous from the viewpoint of processability, and from the viewpoint of environmental aspect, use of process oils having a low PCA content is preferable.

In the case of oil-containing rubber composition, a content thereof is preferably not less than 2 parts by mass, more preferably not less than 5 parts by mass based on 100 parts by mass of the rubber component from the viewpoint of processability. Further, the oil content is preferably not more than 60 parts by mass, more preferably not more than 40 parts by mass from the viewpoint of abrasion resistance and processability.

The rubber composition of the present invention can be prepared by a usual method. The rubber composition can be prepared, for example, by kneading the above-mentioned components except the vulcanizing agent and the vulcanization accelerator with a known kneading apparatus usually used in the rubber industry such as a Banbury mixer, a kneader or an open roll and then adding the vulcanizing agent and the vulcanization accelerator and further kneading the mixture and then carrying out vulcanization.

The rubber composition of the present invention is characterized in that an adhesive force of the rubber composition measured by the following adhesion test method is not less than 300 when an adhesive force of a reference rubber composition wherein the whole amount of resin has been replaced by oil is assumed to be 100.

<Adhesion Test Method>

The adhesion test method comprises:

a preparation step of preparing a test rubber, a friction test step of conducting a wet friction test and generating an adhesive substance on a surface of the test rubber, a step of measuring the adhesive substance wherein a volume of the adhesive substance and an adhesive force per unit area of the adhesive substance are measured, and an evaluation step of evaluating an adhesive force of the test rubber based on the volume of the adhesive substance and the adhesive force per unit area of the adhesive substance.

In the present invention, the adhesive force of the rubber composition measured by the specified adhesion test method is not less than 300, preferably not less than 400, further preferably not less than 500 when an adhesive force of the reference rubber composition is assumed to be 100. When the adhesive force is less than 300, wet grip performance tends to be inferior. Further, an upper limit of the adhesive force of the rubber composition is not limited particularly, and is preferably not more than 3000, more preferably not more than 2000.

The specified adhesion test method is explained below by adequately referring to the drawings.

Figure 2:
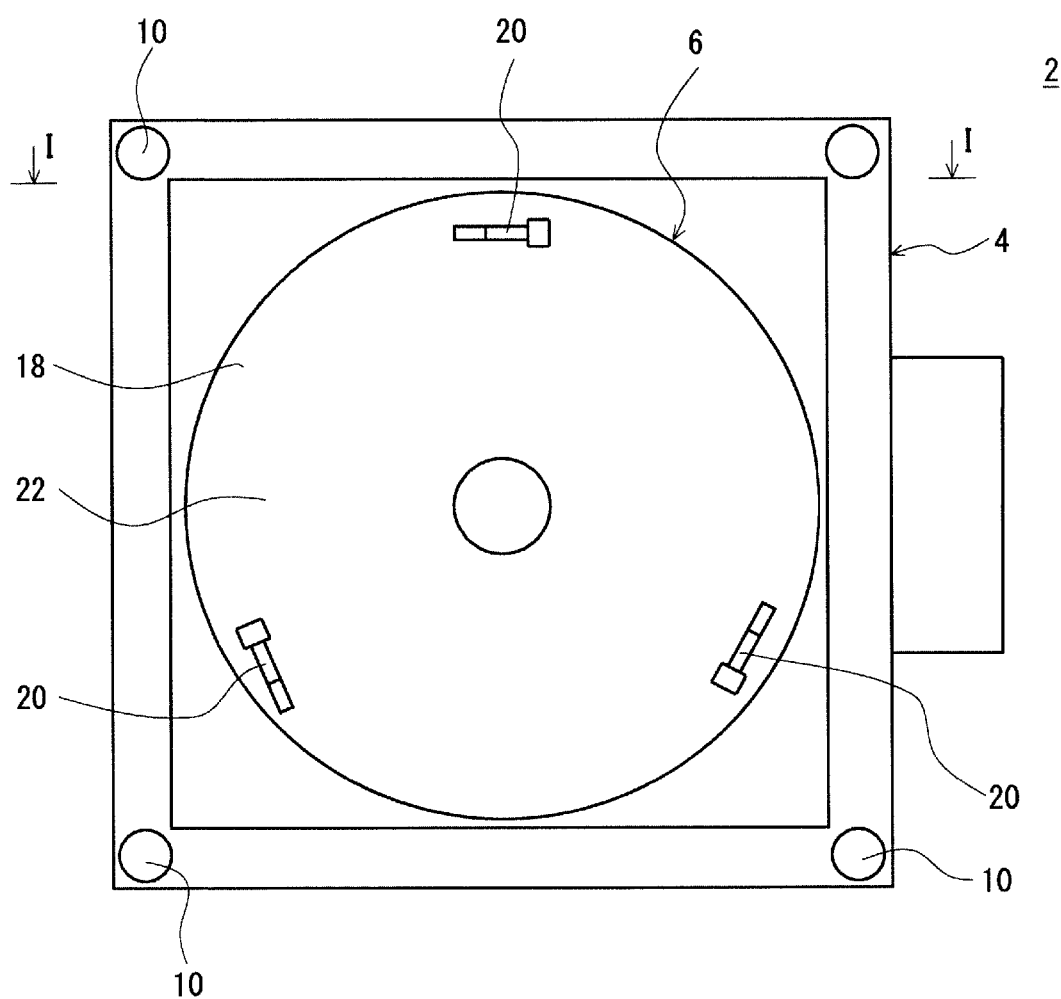
FIG. 2 is a bottom view of the test apparatus of FIG. 1.

FIG. 1 and FIG. 2 show a friction test apparatus 2 to be used for the adhesion test method. FIG. 2 shows a bottom view of this test apparatus 2. FIG. 1 is a cross-sectional view of a line I-I of FIG. 2. Here, for the convenience sake, the explanation is made on the assumption that the vertical direction of FIG. 1 is a vertical direction, the lateral direction of FIG. 1 is a lateral direction and the vertical direction on the surface of FIG. 1 is a longitudinal direction.

The friction test apparatus 2 is provided with a main body 4 and a measuring means 6. The main body 4 is provided with a support member and a drive unit though they are not shown in the drawings. The main body 4 is provided with mounting seats 10 coming into contact with a road surface 8. The measuring means 6 is provided with a drive shaft 12, a drive disc 14, a measuring shaft 16, a measuring disc 18 and a measuring element 20.

The measuring means 6 is supported by the support member of the main body 4. The support member of the main body 4 supports the measuring means 6 so that the measuring means 6 is movable in the vertical direction. The support member of the main body 4 supports the measuring means 6 so that the measuring means 6 is rotatable. The drive unit of the main body 4 can rotate the drive shaft 12 of the measuring means 6. The measuring means 6 is rotatable by the drive unit of the main body 4 around the axis of the drive shaft 12 as the rotation shaft.

The drive disc 14 of the measuring means 6 is fixed integrally to the bottom end of the drive shaft 12. The center line of the drive disc 14 is aligned with the axis of the drive shaft 12. The measuring shaft 16 is rotatably supported on the drive shaft 12. The movement of the measuring shaft 16 in the vertical direction is restricted by the drive shaft 12. The measuring disc 18 is fixed integrally to the bottom end of the measuring shaft 16. The axis of the measuring shaft 16 is aligned with the center line of the measuring disc 18. The axis of the drive shaft 12 is aligned with the axis of the measuring shaft 16.

The measuring means 6 is provided with an elastic means for connecting the drive disc 14 to the measuring disc 18 and a position sensor for measuring a positional deviation of the drive disc 14 from the measuring disc 18 though the elastic means and the position sensor are not shown in the drawings. The elastic means connects the drive disc 14 to the measuring disc 18. The elastic means connects the drive disc 14 to the measuring disc 18 while allowing for positional deviation thereof in a rotational direction. The position sensor can measure displacement of the elastic means The measuring disc 18 is provided with a bottom surface 22. The bottom surface 22 faces the road surface 8. To the bottom surface 22 are fixed three measuring elements 20. The three measuring elements 20 are arranged at an equal interval in a circumferential direction of the measuring disc 18. A fixed end 20a of the measuring element 20 is fixed to the bottom surface 22. The measuring element 20 extends from the fixed end 20a up to an un-fixed free end 20b. The measuring element 20 extends in a tangential direction of the circumference of the measuring disc 18. The measuring element 20 extends in a direction reverse to the rotation direction of the measuring means 6 from the fixed end 20a up to the free end 20b. The measuring element 20 extends in a direction drawing close to the road surface 8 from the bottom surface 22 in a direction from the fixed end 20a up to the free end 20b. The free end 20b of the measuring element 20 is located apart from the bottom surface 22.

Figure 3A:
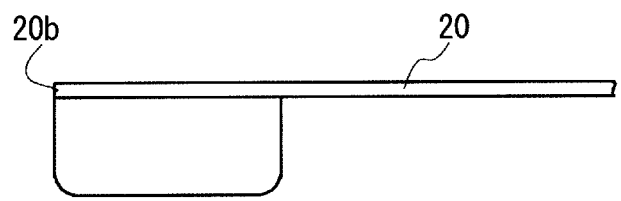
FIG. 3A is a front view of a test rubber before the test which is mounted on the test apparatus of FIG. 1 to evaluate an adhesive force thereof.
Figure 3B:
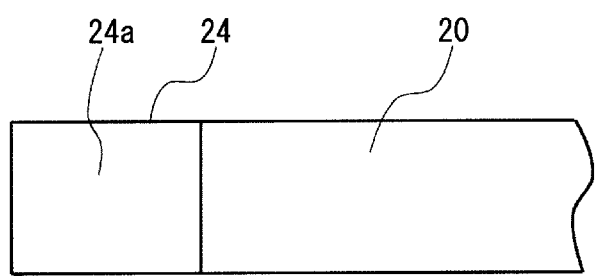
FIG. 3B is a bottom view of the test rubber before the test which is mounted on the test apparatus of FIG. 1.

In FIG. 3A and FIG. 3B, a rubber test piece 24 as a test rubber and the neighborhood of the free end 20b of the measuring element 20 are shown. The vertical direction, the lateral direction and the longitudinal direction of FIG. 3A are the same as in FIG. 1. FIG. 3B shows the bottom surface of the rubber test piece 24 in the same manner as in FIG. 2. This rubber test piece 24 is fixed at the free end 24b side of the measuring element 20. This rubber test piece 24 is provided with a surface 24a facing the road surface 8. This surface 24a is substantially plane. The both lateral ends of the surface 24a are chamfered to be curved.

Figure 4A:
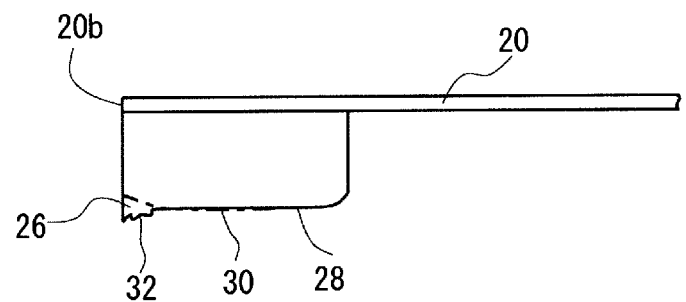
FIG. 4A is a front view of the test rubber of FIG. 3 after the test.
Figure 4B:
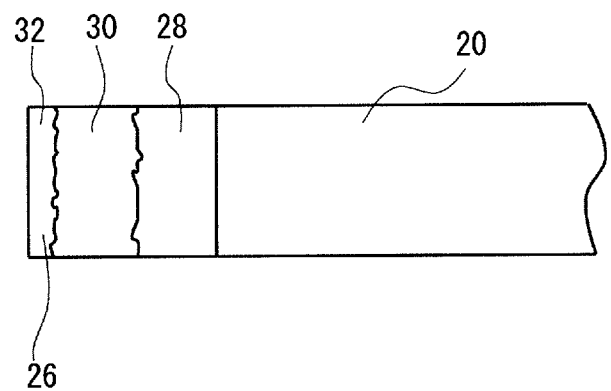
FIG. 4B is a bottom view of the test rubber of FIG. 3 after the test.

In FIG. 4A and FIG. 4B, the rubber test piece 24 after the friction test is shown. In FIG. 4A, the right direction is a front side of the rotational direction and the left direction is a rear side when the rubber test piece 24 is rubbed with the road surface 8. In FIG. 4A, the long dashed dotted line shows the shape of the surface 24a of FIG. 3A before the friction test.

As shown in FIG. 4B, the surface 24a of the rubber test piece 24 after the friction test is composed of a non-contacting part 28, a rubbed part 30 and a deposition part 32. The non-contacting part 28 is located at the front side of the rotational direction when the rubber test piece 24 is rubbed with the road surface 8. This non-contacting part 28 is a part which has not come into contact with the road surface 8 in the friction test. The deposition part 32 is located at the rear side of the rotational direction. The deposition part 32 is a part where the adhesive substance 26 has been generated. The rubbed part 30 is located between the non-contacting part 28 and the deposition part 32 in the rotational direction. The rubbed part 30 is a part which is rubbed with the road surface 8.

As shown in FIG. 4A and FIG. 4B, by rubbing the rubber test piece 24 with the road surface 8, a scratch is generated on the surface 24a. On the surface 24a, a part where the scratch is generated is the rubbed part 30. When the road surface 8 is a wet surface, as a result of formation of the rubbed part 30, the adhesive substance 26 is generated on the surface 24a. In the present invention, rubbing of the road surface 8 with the rubber test piece 24 so as to generate the adhesive substance 26 on the surface 24a is referred to as wet friction. This adhesive substance 26 is deposited at the rear side on the surface 24a in the rotational direction. On the surface 24a, a part where the adhesive substance 26 is deposited is the deposition part 32. This deposition part 32 is protruding downward from the surface 24a. The deposition of the adhesive substance on this deposition part 32 is present from one end to another end of the width direction of the surface 24a being vertical in the rotational direction.

This wet friction is performed on a wet road surface having a measured friction value of not less than 10 BPN and not more than 100 BPN using water having a temperature of not lower than 1° C. and not higher than 60° C. For example, the wet friction is performed on an asphalt road surface of 50 BPN using water of 20° C. In this method of measuring a friction value on the wet road surface, Standard Test Method for Determining longitudinal Peak Braking Coefficient of Paved Surfaces Using a Standard Reference Test Tire provided in ASTM E1337 (American Society for Testing and Materials) is used. A BPN tester (British Pendulum Tester) provided in ASTM E303 is used.

The above-mentioned adhesion test method comprises a preparation step, a friction test step, an adhesive substance measurement step and an evaluation step. The test method using the test apparatus 2 shown in FIG. 1 and FIG. 2 and the rubber test piece 24 shown in FIG. 3 is explained.

In the preparation step, the test apparatus 2 and the rubber test piece 24 are prepared. The rubber test piece 24 is prepared from a vulcanized rubber composition. The rubber test piece 24 is fixed to the measuring element 20. The surface 24a of the rubber test piece 24 is faced to the road surface 8. In this test apparatus 2, the rubber test piece 24 is fixed to each of the three measuring elements 20. The number of measuring elements 20 and rubber test pieces 24 may be one each, or may be two each, three each or four or more.

In the friction test step, the test apparatus 2 is loaded on the road surface 8 being a wet road surface. The mounting seats 10 are brought into contact with the road surface 8. The support member of the test apparatus 2 moves the measuring means 6 upward, thereby allowing the rubber test piece 24 to be in a state being separated from the road surface 8.

In a state of the rubber test piece 24 being separated from the road surface 8, the drive unit of the test apparatus 2 rotates the measuring means 6, thereby rotating the drive disc 14 and the measuring disc 18. In this case, the drive disc 14 and the measuring disc 18 rotate simultaneously. This drive unit rotates the drive disc 14 and the measuring disc 18 at a specified rotational speed. The driving of the drive unit is shut down when the specified rotational speed is reached. After the shutting down of the driving of the drive unit, the drive disc 14 and the measuring disc 18 continue the rotation by a force of inertia. At this specified rotational speed, the rubber test piece 24 is rotating at a given speed. This given speed is an initial velocity of an inertial friction to be explained infra. This initial velocity is, for example, 15 km/h.

The supporting member of the test apparatus 2 gradually lowers the supporting position of the measuring means 6. The measuring means 6 gradually moves downward. This supporting member does not bias the measuring means 6 downward. The measuring means 6 moves downward by its self weight. Thereafter, the surface 24a of the rubber test piece 24 comes into contact with the road surface 8. The rubber test piece 24 is pressed onto the road surface 8 by the self weight of the measuring means 6.

There is generated a frictional resistance between the surface 24a of the rubber test piece 24 and the road surface 8. This frictional resistance decreases the rotational speed of the measuring disc 18. There arises a positional deviation in the rotational direction between the drive disc 14 and the measuring disc 18. In other words, there arises a relative displacement of a rotation angle between the drive disc 14 and the measuring disc 18. Thereafter, this frictional resistance stops the rotation of the drive disc 14 and the rotation of the measuring disc 18. Herein, a state of generating a frictional resistance when the rubber test piece 24 rotating by a force of inertia is brought into contact with the road surface 8 is referred to as an inertial friction.

A position sensor measures a displacement of the elastic means connecting the drive disc 14 and the measuring disc 18. The position sensor measures a displacement of the elastic means until the rotation of the drive disc 14 and the rotation of the measuring disc 18 stop after the surface 24a of the rubber test piece 24 has been brought into contact with the road surface 8. The relative displacement of a rotation angle between the drive disc 14 and the measuring disc 18 is determined from this displacement of the elastic means. When the rotation of the drive disc 14 and the rotation of the measuring disc 18 stop, the position sensor terminates measurement of the displacement of the elastic means.

The frictional resistance applied to the measuring disc 18 is calculated from the relative displacement of a rotation angle between the drive disc 14 and the measuring disc 18. A coefficient of dynamic friction is calculated from the frictional resistance and the self weight of the measuring means 6.

The test apparatus 2 is provided with an output device not shown in the drawings, for example, an X-Y recorder. To this output device are outputted the relative displacement and the rotation speed of the drive disc 14 and the measuring disc 18. Further, the test apparatus 2 may be provided with a computing unit. This computing unit may calculate a frictional resistance and a coefficient of dynamic friction. The results of the calculations may be outputted into the output device.

In the test method, a time interval from a point of time when the rubber test piece 24 comes into contact with the road surface 8 and begins sliding on the road surface 8 up to a point of time when the rubber test piece 24 stops on the road surface 8 is called one cycle of an inertial friction. In this friction test step, plural cycles of the inertial friction are repeated until the adhesive substance 26 is generated. In this friction test step, after the rubber test piece 24 is formed into a state of being separated from the road surface 8 by the support member of the test apparatus 2, a series of steps of bringing the rubber test piece 24 into contact with the road surface until the rotations of the drive disc 14 and the measuring disc 18 rotating by a force of an inertia are stopped may be performed. In this friction test step, it is not always necessary to carry out the measurement of a displacement of the elastic means, the calculation of a frictional resistance and the calculation of a coefficient of dynamic friction.

In the adhesive substance measurement step, a volume of the adhesive substance 26 and an adhesive force per unit area of the adhesive substance 26 are measured. With respect to the volume of the adhesive substance 26, a volume of the protruded portion on the surface 24a of the rubber test piece 24 which has been generated in the friction test is obtained. For example, a non-contact surface roughness measuring instrument is provided. A surface shape of the surface 24a of the rubber test piece 24 after the friction test is determined with this roughness measuring instrument. The volume of a portion protruding from the surface 24a of the rubber test piece 24 is calculated from the surface shape of the surface 24a of the rubber test piece 24 after the friction test and the surface shape before the friction test. This volume is assumed to be a volume of the adhesive substance 26. The surface roughness measuring apparatus used as the non-contact surface roughness measuring instrument is one comprising a shape measurement system (KS-1100), a measuring unit of a laser measuring instrument (LT-9010M) and a controller of a laser measuring instrument (LT-9500) manufactured by KEYENCE CORPORATION.

The adhesive substance 26 is generated from the rubber test piece 24 and is soft and is prone to be deformed. For measurement of a volume of the adhesive substance 26, the non-contact surface roughness measuring instrument is suitable. Further, a thickness of the adhesive substance 26 is small. From a point of measuring the volume of the adhesive substance 26 highly accurately, the above-mentioned non-contact surface roughness measuring instrument is suitable.

The adhesive force of the adhesive substance 26 per unit area is obtained in a manner mentioned below. An indentation hardness tester is prepared. An indenting tool of the hardness tester is pressed into the adhesive substance 26 with a minimum load. This indenting tool is press-welded to the adhesive substance 26. The press-welded indenting tool is separated from the adhesive substance 26. A maximum attracting force F which acts between the indenting tool and the adhesive substance 26 when separating the indenting tool from the adhesive substance 26 is measured. The maximum attracting force F is converted to a value per unit area to calculate an adhesive force per unit area of the adhesive substance 26. For example, a load-controlled indentation tester ENT-2100 manufactured by ELIONIX INC. is used as an indentation hardness tester. In this indentation hardness tester, a spherical indenting tool is pressed into the adhesive substance 26 of the rubber test piece 24. The pressing depth is measured with a deformation meter. During a time interval after the indenting tool begins separating from the adhesive substance 26 until separation is completed, an attracting force between the indenting tool and the adhesive substance 26 is measured continuously. A maximum value of this attracting force is assumed to be the maximum attracting force F.

The thickness of the adhesive substance 26 is very small as compared with the thickness of the rubber test piece 24. The surface area of the adhesive substance 26 is very small as compared with the area of the surface 24a of the rubber test piece 24. For measurement of the adhesive force of the adhesive substance 26, the load-controlled indentation tester is suitable.

In the evaluation step, an index of an adhesive frictional force of the rubber composition of the present invention is calculated. This index of an adhesive frictional force means an index calculated based on the volume and adhesive force per unit area of the adhesive substance 26 obtained in the adhesive substance measurement step. The larger the volume of the adhesive substance 26 is, the larger the index of an adhesive frictional force is, and the larger the adhesive force per unit area is, the larger the index of an adhesive frictional force is. For example, this index of an adhesive frictional force is obtained as an integrated value of the volume and the adhesive force per unit area of the adhesive substance. The larger the index of an adhesive frictional force is, the larger the adhesive force of the rubber test piece 24 is.

In the various tests made by the inventors of the present invention, it has been confirmed that the adhesive force of the rubber test piece 24 which gives a large volume of the adhesive substance 26 in the friction test is large. In this test method, the adhesive substance 26 is generated on the surface 24a of the rubber test piece 24. The adhesive force of the rubber test piece 24 is evaluated based on the volume and adhesive force per unit area of the adhesive substance 26. Thus, the adhesive force of the rubber test piece 24 can be evaluated easily and highly accurately.

The adhesive force of the adhesive substance 26 decreases as time passes after the friction test. In the test method, the measurement of the adhesive force per unit area of the rubber test piece 24 is carried out preferably within five hours, further preferably within three hours, particularly preferably within one hour after termination of the friction test. A time period after termination of the friction test is measured as an elapsed time after the rubber test piece 24 sliding on the road surface 8 stops on the road surface 8 in the step of the friction test. In the case where the above-mentioned inertial friction is repeated plural times, the time period is measured as an elapsed time after the rubber test piece 24 stops on the road surface 8 in the last cycle.

When comparative evaluation is made with respect to a plurality of different test rubbers, it is preferable that a difference in an elapsed time after termination of the friction test is small. A difference in an elapsed time after termination of the friction test is within one hour.

In the test apparatus 2, the rubber test piece 24 is in contact with the road surface 8 due to a self-weight of the measuring means 6. A biasing force other than the self-weight of the measuring means 6 is not applied to the rubber test piece 24. Since the rubber test piece 24 is brought into contact with the road surface 8 due to the self-weight of the measuring means, the adhesive substance 26 is easily generated. From this point of view, a pressure for biasing the rubber test piece 24 onto the road surface 8 preferably exceeds 0 and is not more than 0.3 MPa. Similarly, from the viewpoint of generation of the adhesive substance 26, an initial velocity of the inertial friction is preferably not less than 7 km/h. From a point of stably sliding the rubber test piece 24 on the road surface 8 while the rubber test piece 24 being in contact with the road surface 8, the initial velocity is preferably not more than 15 km/h.

In this test apparatus 2, the rubber test piece 24 and the road surface 8 are subject to inertial friction. Due to this inertial friction, the adhesive substance 26 is easily generated. Thus, from a point of easily generating the adhesive substance 26, a D.F. Tester (Dynamic Friction Tester) manufactured by NIPPO LTD. is suitable as the test apparatus 2.

If an amount of the adhesive substance 26 generated in the step of friction test is too small, accuracy of the evaluation of the adhesive force decreases. From the viewpoint of evaluating the adhesive force highly accurately, it is preferable that the inertial friction is repeated in plural cycles. From this point of view, it is preferable to repeat the inertial friction in two or more cycles. On the other hand, in the measurement of the adhesive force with the indentation hardness tester, the adhesive force can be measured highly accurately, as a measuring surface is flatter. If the amount of the adhesive substance 26 is too large, accuracy of the measurement of an adhesive force with the indentation hardness tester decreases. From this point of view, it is preferable to repeat the inertial friction in seven cycles or less.

The rubber composition of the present invention is characterized in that a loss tangent $\tan \delta_{70°\,C.}$ at 70° C. thereof is not more than 125, assuming that in the case of a reference rubber composition wherein the total amount of resin has been replaced by oil, its loss tangent $\tan \delta_{70°\,C.}$ at 70° C. is 100. The $\tan \delta_{70°\,C.}$ is an index for fuel efficiency.

In the case where the loss tangent $\tan \delta_{70°\,C.}$ of the reference rubber composition is assumed to be 100, the loss tangent $\tan \delta_{70°\,C.}$ at 70° C. of the rubber composition of the present invention is not more than 125, preferably not more than 120. When the $\tan \delta_{70°\,C.}$ exceeds 120, fuel efficiency tends to be inferior. Further, a lower limit of the $\tan \delta_{70°\,C.}$ is not limited particularly.

Further the rubber composition of the present invention is characterized in that a ratio of a loss tangent $\tan \delta_{0°\,C.}$ at 0° C. to the loss tangent $\tan \delta_{70°\,C.}$ at 70° C. ($\tan \delta_{0°\,C.}/\tan \delta_{70°\,C.}$) is from 3.0 to 10. The $\tan \delta_{0°\,C.}$ indicates how large the hysteresis loss friction is and becomes an index for wet grip performance. Further, as mentioned above, $\tan \delta_{70°\,C.}$ becomes an index for fuel efficiency. When the ratio of $\tan \delta(\tan \delta_{0°\,C.}/\tan \delta_{70°\,C.})$ is within a specified range, wet grip performance and fuel efficiency are excellent in a good balance.

The ratio of the loss tangent $\tan \delta_{0°\,C.}$ at 0° C. to the loss tangent $\tan \delta_{70°\,C.}$ at 70° C. ($\tan \delta_{0°\,C.}/\tan \delta_{70°\,C.}$) of the rubber composition of the present invention is not less than 3.0, preferably not less than 3.5, more preferably not less than 4.0. When ($\tan \delta_{0°\,C.}/\tan \delta_{70°\,C.}$) is less than 3.0, there is a tendency that wet grip performance is inferior and compatibility of wet grip performance with fuel efficiency is difficult. On the other hand, ($\tan \delta_{0°\,C.}/\tan \delta_{70°\,C.}$) is not more than 10, preferably not more than 8.0, more preferably not more than 5.0. When ($\tan \delta_{0°\,C.}/\tan \delta_{70°\,C.}$) is more than 10, there is a tendency that fuel efficiency is inferior and compatibility of fuel efficiency with wet grip performance is difficult.

The tire of the present invention can be produced by a usual method using a tread produced using the rubber composition according to the present invention. That is, the rubber composition according to the present invention is extruded into the shape of a tread of a tire in an unvulcanized stage, and laminated with other components of the tire in a tire building machine to form an unvulcanized tire. This unvulcanized tire is heated and pressurized in a vulcanizer to produce the tire of the present invention.

Example

The present invention will be described based on Examples, but the present invention is not limited thereto only.

A variety of chemicals used in Examples and Comparative Examples will be collectively explained below.

SBR: Nipol NS616 (un-modified S-SBR) manufactured by ZEON CORPORATION

BR: BR150B (high-cis BR, cis-content: 98%) manufactured by Ube Industries, Ltd.

Oil: TDAE oil (process oil) manufactured by JX Nippon Oil & Energy Corporation

Resin 1: Oppera PR-100 (hydrogenated DCPD resin, softening point: 140° C.) manufactured by Exxon Mobil Corporation Resin 2: Oppera PR-120 (hydrogenated DCPD resin, softening point: 120° C.) manufactured by Exxon Mobil Corporation Resin 3: Oppera PR-140 (hydrogenated DCPD resin, softening point: 100° C.) manufactured by Exxon Mobil Corporation Resin 4: YS RESIN PX1150 (terpene resin, softening point: 115° C.) manufactured by Yasuhara Chemical Co., Ltd.

Resin 5: YS RESIN PX1000 (terpene resin, softening point: 100° C.) manufactured by Yasuhara Chemical Co., Ltd.

Resin 6: YS RESIN PX1150N (terpene resin, pinene polymer, softening point: 115° C.) manufactured by Yasuhara Chemical Co., Ltd.

Resin 7: CLEARON P85 (hydrogenated terpene resin, softening point: 85° C.) manufactured by Yasuhara Chemical Co., Ltd.

Resin 8: CLEARON P125 (hydrogenated terpene resin, softening point: 125° C.) manufactured by Yasuhara Chemical Co., Ltd.

Resin 9: Sylvares AS85 (α-methyl styrene/styrene resin, softening point: 85° C.) manufactured by Arizona Chemical Company Resin 10: Oppera PR-395 (C9/hydrogenated DCPD resin, softening point: 120° C.) manufactured by Exxon Mobil Corporation Resin 11: Oppera PR-373 (C5/C9 resin, softening point: 90° C.) manufactured by Exxon Mobil Corporation Resin 12: YS POLYSTER T80 (terpene phenol resin, softening point: 80° C.) manufactured by Yasuhara Chemical Co., Ltd.

Resin 13: YS POLYSTER T145 (terpene phenol resin, softening point: 145° C.) manufactured by Yasuhara Chemical Co., Ltd.

Carbon black: NITERON #55S ($N_2AS$: 28 $m^2/g$) manufactured by NSCC Carbon Co., Ltd.

Silica: Ultrasil VN3 ($N_2AS$: 175 $m^2/g$) manufactured by Evonik Degussa Silane coupling agent: Si69 (bis(3-triethoxysilylpropyl)tetrasulfide) manufactured by Evonik Degussa Stearic acid: Stearic acid manufactured by NOF Corporation Anti-aging agent: NOCRAC 6C (N-(1,3-dimethylbutyl)-N'-phenyl-p-phenylenediamine) manufactured by OUCHI SHINKO CHEMICAL INDUSTRIAL CO., LTD.

Zinc oxide: Zinc Oxide manufactured by Mitsui Mining & Smelting Co., Ltd.

Sulfur: Powdered sulfur manufactured by Tsurumi Chemical Industry Co., Ltd.

Vulcanization accelerator: Nocceler NS (N-tert-butyl-2-benzothiazolylsulfeneamide) manufactured by OUCHI SHINKO CHEMICAL INDUSTRIAL CO., LTD.

According to compounding formulations shown in Tables 1 to 3, chemicals other than sulfur and a vulcanization accelerator were kneaded with a 1.7 L enclosed Banbury mixer at the temperature at discharge of 150° C. for 5 minutes to obtain a kneaded product. Then, to the kneaded product were added sulfur and the vulcanization accelerator, and the mixture was kneaded for 5 minutes until the temperature reached 80° C. to obtain an unvulcanized rubber composition. The obtained unvulcanized rubber composition was subjected to vulcanization molding at 170° C. for 20 minutes to obtain a rubber composition for test. With respect to the obtained rubber composition for test, the following adhesion test and viscoelasticity test were conducted. The results are shown in Tables 1 to 3.

Further, the obtained unvulcanized rubber composition was formed into the shape of a tread, laminated with other components of the tire in a tire building machine, and vulcanized at 170° C. for 12 minutes to obtain a tire for test. With respect to the obtained tire for test, the following wet grip performance test and fuel efficiency test were conducted. The results are shown in Tables 1 to 3.

<Adhesion Test>

An adhesive force of each rubber composition for a test was indicated with an index in accordance with the following formula by the above-mentioned adhesion test method, assuming the adhesive force of the rubber composition of Comparative Example (a reference rubber composition) to be 100 wherein the whole amount of resin had been replaced by oil. The larger the index is, the higher the adhesive force is. The D.F. tester manufactured by NIPPO LTD. was used as a test apparatus. In this method, the number of cycles of inertial friction where a proper size of adhesive substance is obtained was determined. The number of cycles was five times. The above-mentioned adhesion test method was conducted for each rubber composition for a test in this number of cycles. Used as the surface roughness measuring apparatus were a shape measurement system (KS-1100), a measuring unit of a laser measuring instrument (LT-9010M) and a controller of a laser measuring instrument (LT-9500) manufactured by KEYENCE CORPORATION. A load-controlled indentation tester ENT-2100 manufactured by ELIONIX INC. was used as an indentation hardness tester.

(Index of adhesive force)=(Adhesive force of each formulation)/(Adhesive force of reference rubber composition)×100

<Viscoelasticity Test>

A loss tangent (tan $\delta_{0°\ C.}$) at 0° C. and a loss tangent (tan $\delta_{70°\ C.}$) at 70° C. of the rubber composition for a test were measured using a viscoelasticity spectrometer manufactured by IWAMOTO Quartz GlassLabo Co., Ltd. under the conditions of an initial strain of 10%, a dynamic strain of 0.1% and a frequency of 10 Hz to calculate a ratio of (tan $\delta_{0°\ C.}$/tan $\delta_{70°\ C.}$). Each tan $\delta$ was indicated with an index in accordance with the following formula, assuming each of the tan $\delta$ of the rubber composition of Comparative Example (a reference rubber composition) to be 100 wherein the whole amount of resin had been replaced by oil. The smaller the index of tan $\delta_{70°\ C.}$ is, the lower the rolling resistance is and the more excellent the fuel efficiency is. Further, the larger the index of tan $\delta_{0°\ C.}$ is, the larger the hysteresis loss friction is and the more excellent the wet grip performance is.

(Index of tan $\delta_{70°\ C.}$)=(Tan $\delta_{70°\ C.}$ of each formulation)/(Tan $\delta_{70°\ C.}$ of reference rubber composition)×100

(Index of tan $\delta_{0°\ C.}$)=(Tan $\delta_{0°\ C.}$ of each formulation)/(Tan $\delta_{0°\ C.}$ of reference rubber composition)×100

<Wet Grip Performance Test>

The tires for test were mounted on all wheels of a vehicle (2000 cc domestic FF car). A braking distance after braking at a speed of 100 km/hr on a wet asphalt road was measured. The wet grip performance was indicated with an index in accordance with the following formula, assuming the wet grip performance of the rubber composition of Comparative Example (a reference example) to be 100 wherein the whole amount of resin had been replaced by oil. The larger the index of the wet grip performance is, the more excellent the wet grip performance is. A target value for performance is not less than 160.

(Index of wet grip performance)=(Braking distance of reference example)/(Braking distance of each formulation)×100

<Fuel Efficiency Test>

Rolling resistance of tires for test when each tire was run under conditions of a rim (15×6 JJ), an inner pressure (230 kPa), a load (3.43 kN) and a speed (80 km/h) was measured with a rolling resistance testing machine and the fuel efficiency was indicated with an index in accordance with the following formula, assuming the rolling resistance of the test tire of Comparative Example (a reference example) to be 100 wherein the whole amount of resin had been replaced by oil. The larger the index is, the more excellent the fuel efficiency is. A target value for performance is not less than 90.

(Index of fuel efficiency)=(Rolling resistance of reference example)/(Rolling resistance of each formulation)×100

TABLE 1

|  | Comparative Examples | | | | | | | |
| --- | --- | --- | --- | --- | --- | --- | --- | --- |
|  | 1 | 2 | 3 | 4 | 5 | 6 | 7 | 8 |
|  | Compounded amount (part by mass) | | | | | | | |
| SBR | 80 | 80 | 80 | 80 | 80 | 80 | 80 | 80 |
| BR | 20 | 20 | 20 | 20 | 20 | 20 | 20 | 20 |
| Oil | 25 | 5 | 5 | 5 | 5 | 5 | 5 | 5 |
| Resin 1 | — | — | — | — | — | — | — | — |
| Resin 2 | — | — | — | — | — | — | — | — |
| Resin 3 | — | 20 | — | — | — | — | — | — |
| Resin 4 | — | — | 20 | — | — | — | — | — |
| Resin 5 | — | — | — | 20 | — | — | — | — |
| Resin 6 | — | — | — | — | 20 | — | — | — |
| Resin 7 | — | — | — | — | — | 20 | — | — |
| Resin 8 | — | — | — | — | — | — | — | — |

TABLE 1-continued

| | Comparative Examples | | | | | | | |
|---|---|---|---|---|---|---|---|---|
| | 1 | 2 | 3 | 4 | 5 | 6 | 7 | 8 |
| | Compounded amount (part by mass) | | | | | | | |
| Resin 9 | — | — | — | — | — | — | — | — |
| Resin 10 | — | — | — | — | — | — | — | — |
| Resin 11 | — | — | — | — | — | — | — | — |
| Resin 12 | — | — | — | — | — | — | 20 | — |
| Resin 13 | — | — | — | — | — | — | — | 20 |
| Carbon black | 10 | 10 | 10 | 10 | 10 | 10 | 10 | 10 |
| Silica | 80 | 80 | 80 | 80 | 80 | 80 | 80 | 80 |
| Silane coupling agent | 8 | 8 | 8 | 8 | 8 | 8 | 8 | 8 |
| Stearic acid | 2 | 2 | 2 | 2 | 2 | 2 | 2 | 2 |
| Anti-aging agent | 2 | 2 | 2 | 2 | 2 | 2 | 2 | 2 |
| Zinc oxide | 2 | 2 | 2 | 2 | 2 | 2 | 2 | 2 |
| Sulfur | 1.5 | 1.5 | 1.5 | 1.5 | 1.5 | 1.5 | 1.5 | 1.5 |
| Vulcanization accelerator | 2 | 2 | 2 | 2 | 2 | 2 | 2 | 2 |
| Physical properties | | | | | | | | |
| Adhesive force (index) | 100 | 130 | 221 | 134 | 84 | 175 | 277 | 284 |
| $\tan\delta_{0°C.}$ (index) | 100 | 150 | 151 | 148 | 146 | 138 | 132 | 156 |
| $\tan\delta_{70°C.}$ (index) | 100 | 114 | 120 | 120 | 127 | 106 | 115 | 128 |
| $\tan\delta_{0°C.}/\tan\delta_{70°C.}$ (index) | 3.2 | 4.4 | 3.4 | 3.3 | 3.0 | 3.7 | 3.1 | 3.1 |
| Evaluation | | | | | | | | |
| Wet grip performance (index) | 100 | 148 | 159 | 146 | 138 | 143 | 149 | 171 |
| Fuel efficiency (index) | 100 | 93 | 90 | 90 | 87 | 98 | 93 | 87 |

TABLE 2

| | Examples | | | | | |
|---|---|---|---|---|---|---|
| | 1 | 2 | 3 | 4 | 5 | 6 |
| | Compounded amount (part by mass) | | | | | |
| SBR | 80 | 80 | 80 | 80 | 80 | 80 |
| BR | 20 | 20 | 20 | 20 | 20 | 20 |
| Oil | 5 | 5 | 5 | 5 | 5 | 5 |
| Resin 1 | 20 | — | — | — | — | — |
| Resin 2 | — | 20 | — | — | — | — |
| Resin 3 | — | — | — | — | — | — |
| Resin 4 | — | — | — | — | — | — |
| Resin 5 | — | — | — | — | — | — |
| Resin 6 | — | — | — | — | — | — |
| Resin 7 | — | — | — | — | — | — |
| Resin 8 | — | — | 20 | — | — | — |
| Resin 9 | — | — | — | 20 | — | — |
| Resin 10 | — | — | — | — | 20 | — |
| Resin 11 | — | — | — | — | — | 20 |
| Resin 12 | — | — | — | — | — | — |
| Resin 13 | — | — | — | — | — | — |
| Carbon black | 10 | 10 | 10 | 10 | 10 | 10 |
| Silica | 80 | 80 | 80 | 80 | 80 | 80 |
| Silane coupling agent | 8 | 8 | 8 | 8 | 8 | 8 |
| Stearic acid | 2 | 2 | 2 | 2 | 2 | 2 |
| Anti-aging agent | 2 | 2 | 2 | 2 | 2 | 2 |
| Zinc oxide | 2 | 2 | 2 | 2 | 2 | 2 |
| Sulfur | 1.5 | 1.5 | 1.5 | 1.5 | 1.5 | 1.5 |
| Vulcanization accelerator | 2 | 2 | 2 | 2 | 2 | 2 |
| Physical properties | | | | | | |
| Adhesive force (index) | 490 | 305 | 337 | 345 | 535 | 536 |
| $\tan\delta_{0°C.}$ (index) | 168 | 156 | 156 | 148 | 159 | 147 |
| $\tan\delta_{70°C.}$ (index) | 119 | 118 | 120 | 115 | 117 | 117 |
| $\tan\delta_{0°C.}/\tan\delta_{70°C.}$ (index) | 4.3 | 4.2 | 3.5 | 3.6 | 3.7 | 3.4 |
| Evaluation | | | | | | |
| Wet grip performance (index) | 207 | 174 | 177 | 172 | 205 | 194 |
| Fuel efficiency (index) | 90 | 90 | 90 | 93 | 91 | 91 |

TABLE 3

| | Comparative Examples | | | Example | Comparative Examples | | | Example |
|---|---|---|---|---|---|---|---|---|
| | 9 | 10 | 11 | 7 | 12 | 13 | 14 | 8 |
| | Compounded amount (part by mass) | | | | | | | |
| SBR | 80 | 80 | 80 | 80 | 80 | 80 | 80 | 80 |
| BR | 20 | 20 | 20 | 20 | 20 | 20 | 20 | 20 |
| Oil | 35 | 5 | 5 | 5 | 10 | 5 | 5 | 5 |
| Resin 1 | — | — | — | — | — | — | — | — |
| Resin 2 | — | — | — | — | — | — | — | — |
| Resin 3 | — | — | — | — | — | — | — | — |
| Resin 4 | — | — | — | — | — | — | — | — |
| Resin 5 | — | — | — | — | — | — | — | — |
| Resin 6 | — | — | — | — | — | — | — | — |
| Resin 7 | — | — | — | — | — | — | — | — |
| Resin 8 | — | — | — | — | — | — | — | — |
| Resin 9 | — | 30 | — | — | — | 5 | — | — |
| Resin 10 | — | — | 30 | — | — | — | 5 | — |

TABLE 3-continued

|  | Comparative Examples | | | Example | Comparative Examples | | | Example |
|---|---|---|---|---|---|---|---|---|
|  | 9 | 10 | 11 | 7 | 12 | 13 | 14 | 8 |
|  | Compounded amount (part by mass) | | | | | | | |
| Resin 11 | — | — | — | 30 | — | — | 5 | — |
| Resin 12 | — | — | — | — | — | — | — | — |
| Resin 13 | — | — | — | — | — | — | — | — |
| Carbon black | 10 | 10 | 10 | 10 | 10 | 10 | 10 | 10 |
| Silica | 80 | 80 | 80 | 80 | 80 | 80 | 80 | 80 |
| Silane coupling agent | 8 | 8 | 8 | 8 | 8 | 8 | 8 | 8 |
| Stearic acid | 2 | 2 | 2 | 2 | 2 | 2 | 2 | 2 |
| Anti-aging agent | 2 | 2 | 2 | 2 | 2 | 2 | 2 | 2 |
| Zinc oxide | 2 | 2 | 2 | 2 | 2 | 2 | 2 | 2 |
| Sulfur | 1.5 | 1.5 | 1.5 | 1.5 | 1.5 | 1.5 | 1.5 | 1.5 |
| Vulcanization accelerator | 2 | 2 | 2 | 2 | 2 | 2 | 2 | 2 |
| Physical properties | | | | | | | | |
| Adhesive force (index) | 100 | 288 | 360 | 308 | 100 | 368 | 311 | 377 |
| $\tan\delta_{0°\ C.}$ (index) | 100 | 178 | 196 | 180 | 100 | 113 | 114 | 115 |
| $\tan\delta_{70°\ C.}$ (index) | 100 | 132 | 135 | 122 | 100 | 106 | 100 | 105 |
| $\tan\delta_{0°\ C.}/\tan\delta_{70°\ C.}$ (index) | 2.9 | 3.5 | 3.7 | 3.9 | 2.5 | 2.7 | 2.8 | 3.0 |
| Evaluation | | | | | | | | |
| Wet grip performance (index) | 100 | 191 | 204 | 197 | 100 | 144 | 137 | 160 |
| Fuel efficiency (index) | 100 | 84 | 84 | 90 | 100 | 98 | 100 | 98 |

From the results of Tables 1 to 3, it is seen that the pneumatic tire of the present invention with the tread composed of the rubber composition comprising specified amounts of the rubber component, the silica and the specific resin and having adhesive force and viscoelasticity within specified ranges is excellent in wet grip performance and fuel efficiency in a good balance.

EXPLANATION OF SYMBOLS

2 Test apparatus
4 Main body
6 Measuring means
8 Road surface
12 Drive shaft
14 Drive disc
16 Measuring shaft
18 Measuring disc
20 Measuring element
22 Bottom surface
24 Rubber test piece
26 Adhesive substance
28 Non-contacting part
30 Rubbed part
32 Deposition part

What is claimed is:

1. A pneumatic tire with a tread composed of a rubber composition comprising:
not less than 0.5 part by mass of silica and
not less than 5 parts by mass of a resin
based on 100 parts by mass of a rubber component comprising 40 to 100% by mass of a styrene-butadiene rubber and 0 to 60% by mass of a butadiene rubber,
wherein an adhesive force of the rubber composition measured by the following adhesion test method is not less than 300 when an adhesive force of a reference rubber composition wherein the whole amount of resin has been replaced by oil is assumed to be 100,
a loss tangent $\tan\delta_{70°\ C.}$ at 70° C. of the rubber composition is not more than 125 when a loss tangent $\tan\delta_{70°\ C.}$ of the reference rubber composition is assumed to be 100, and
a ratio of a loss tangent $\tan\delta_{0°\ C.}$ at 0° C. of the rubber composition to the loss tangent $\tan\delta_{70°\ C.}$ at 70° C. of the rubber composition ($\tan\delta_{0°\ C.}/\tan\delta_{70°\ C.}$ is from 3.0 to 10,
a softening point of the resin is not lower than 80° C., and
a cis content of the butadiene rubber is not less than 90% by mass,
wherein the adhesion test method comprises:
preparing a test rubber,
conducting a wet friction test and generating an adhesive substance on a surface of the test rubber,
measuring the adhesive substance wherein a volume of the adhesive substance and an adhesive force per unit area of the adhesive substance are measured, and
evaluating an adhesive force of the test rubber based on the volume of the adhesive substance and the adhesive force per unit area of the adhesive substance.

2. The pneumatic tire of claim 1, wherein a content of the resin is 20 to 50 parts by mass.

3. The pneumatic tire of claim 1, wherein a content of the butadiene rubber in the rubber component is 15 to 40% by mass.

4. The pneumatic tire of claim 3, wherein a content of the butadiene rubber is 20 to 40% by mass.

* * * * *